United States Patent [19]

Louie et al.

[11] Patent Number: 4,721,756
[45] Date of Patent: Jan. 26, 1988

[54] MOLDED RUBBER PRODUCTS

[75] Inventors: Ming K. Louie, Royersford; William R. Sheehan, Phoenixville, both of Pa.

[73] Assignee: The West Company, Phoenixville, Pa.

[21] Appl. No.: 911,518

[22] Filed: Sep. 25, 1986

[51] Int. Cl.$^4$ .......................... C08L 9/00; C08L 15/02; C08K 5/34; C08K 3/22

[52] U.S. Cl. ..................................... 525/245; 525/282; 525/334.1; 525/373; 525/375; 264/275; 264/325

[58] Field of Search ..................... 525/282, 245, 334.1, 525/373, 375; 264/175, 325, 273

[56] References Cited

U.S. PATENT DOCUMENTS 3,334,075 8/1967 Kehn .................................... 525/282
4,020,039 4/1977 Dunn et al. .......................... 525/282

OTHER PUBLICATIONS

Ruppe et al, "A Curing Agent for 'Hypalon' and Coagent Peroxide Cure Systems", Du Pont Product Brochure *HVA-2*.

Vukov et al, "Crosslinking Efficiency of Some Halobutyl Curing Reactions," paper presented at ACS Rubber Division Meeting, Denver, Colo., Oct. 23-26, 1984.

*Primary Examiner*—Allan M. Lieberman
*Attorney, Agent, or Firm*—Eugene E. Renz, Jr.

[57] ABSTRACT

A method of producing a molded rubber product for use in the pharmaceutical industry comprising the steps of mixing a rubber formulation including a halogenated butyl rubber and a curing system of from 0.5 to 2.0 parts by weight of zinc oxide and from 0.5 to 1.5 parts by weight of m-PBM. The parts are based upon the weight of the formulation. A sheet is formed from the mixture by feeding the mixture through a calender means. The calender sheet is molded into a molded rubber product at a pressure of at least 500 psi and at a temperature of up to 375° F. for up to 5 minutes. The formed product is then removed.

17 Claims, No Drawings

MOLDED RUBBER PRODUCTS

FIELD OF THE INVENTION

This invention relates to molded rubber products especially those for use in the pharmaceutical industry. The products are formed from a rubber formulation including a halogenated butyl rubber and a curing system which permits curing in substantially shorter periods.

BACKGROUND OF THE INVENTION

Molded rubber products have been used for many purposes in the pharmaceutical industry, such as for rubber stoppers, eye dropper tips and the like. In most cases, the process of making the molded rubber product is such that large numbers of small parts like stoppers are made as efficiently as possible. Capital equipment costs are high and the need to achieve high volume production is important. Energy consumption is a significant factor in production of these molded rubber products as well, and it is desirable to have a fast and effective process which uses a minimum amount of energy.

Molded rubber products developed specifically for the pharmaceutical industry initially were made from natural rubber. Natural rubber stoppers were an early choice and continued to be a preferred choice of material. However, because of the air permeability limitations of natural rubber, the industry, in time, sought other forms of elastomeric products particularly for rubber stoppers used as closures.

While butyl rubber has a superior air permeability when compared with natural rubber, various butyl rubber materials have not been problem free in their adaptation by the pharmaceutical industry. Specifically, in view of the need for relatively fast curing times, the industry has looked to sulfur as a curing agent. Because sulfur alone does not effect a rapid cure, accelerators, such as MBT, have been added to the formulations to increase the speed of cure. Unfortunately, materials like MBT are undesirable in that, under some conditions, they break down into undesirable by-products, including some which are harmful for pharmaceutical purposes. Normally, curing at higher temperatures increases the rate of cure but also increases the rate of formation of undesirable by-products. Lower temperatures are safer from this standpoint, but are also slower and less efficient. The industry has not yet developed an effective system for making molded rubber products, particularly from butyl rubber, with curing rates during the molding step of less than about 7 to 8 minutes. This time range is almost uniformly established as a standard curing time, because of the chemistries and temperature limitations. Four minute cures, which would substantially improve the efficiency of the equipment being used, are unacceptable using conventional technology. Either the cure is ineffective or the heat necessary to effect a cure at that temperature is severely deleterious.

The use of zinc oxide as a curing agent for halobutyl elastomers is common. The zinc oxide is used as a cure activator or as the sole curing agent.

The use of zinc oxide in butyl and halobutyl rubbers has been investigated to explain the crosslinking reactions. One proposed explanation for the crosslinking mechanism proposes that zinc oxide causes a cationic mechanism leading to the formation of carbon-carbon crosslinks. In a presentation given by R. Vukov and G. J. Wilson at a meeting of the ACS Rubber Division, Denver, Colorado, Oct. 23-26, 1984, the crosslinking efficiency of some halobutyl curing reactions were studied. In that presentation, identified as Vukov et al, a model was proposed and crosslinking efficiencies were measured.

In Vukov et al, m-phenylene bis-maleimide (m-PBM) was used in a crosslinking system in combination with zinc oxide. The system was used to prepare compounds on a cool 3 inch by 8 inch mill. Micro-tensile sheets were cured to full cure at 166° C. Levels above 1 part per hundred parts of rubber of m-PBM used with 5 parts per 100 parts of rubber of zinc oxide were used. Full cure required at least 1.0 phr of m-PBM. In the middle range of 1 to 3 phr, m-PBM is taught as interfering with the zinc oxide crosslinking process.

In the Vukov et al paper, crosslinking density is the important property which is being evaluated. Rate of cure is not considered, nor is there any indication at all that rate of cure improvement is possible. Nothing suggests the formation of pharmaceutically useful molded rubber products such as rubber stoppers. All that can fairly be said is that perhaps 4 phr would be needed, as evidenced by the discussion concerning FIG. 7 of Vukov et al.

There does not appear to be any suggestion that there is available a molded rubber product which can be quickly made, efficiently and at relatively low temperatures and which is suitable for use in the pharmaceutical industry.

SUMMARY OF THE INVENTION

It has now been discovered that a suitable molded rubber product which can be used in the pharmaceutical industry may be prepared according to the following method. The method consists of mixing a rubber formulation, including a halogenated butyl rubber and a curing system of from about 0.5 to about 2.0 parts by weight of zinc oxide and from about 0.5 to about 1.5 parts by weight of mPBM, based upon the weight of the formulation. This mixture is formed into a sheet by feeding the mixture through a calender means. The calendered sheet is then molded into a molded rubber product by subjecting the sheet to a shapeforming pressure of from less than 500 psi to up to 2,000 or more psi at a temperature of up to about 375° F. for about 4 minutes. The product is then removed.

In a preferred embodiment, the mixing step is carried out at less than 200° F. and the calendering step is carried out at a temperature of from about 145° F. to about 200° F. Preferred is a temperature of about 175°-185° F. Preferred halobutyl rubbers are the chlorobutyl and bromobutyl rubbers and both are commercially available. The preferred method of molding the sheet from the calender into a shape suitable for use as a formed rubber product is compression molding. Typically, a cure time for the compression mold step is about 3 to about 5 minutes, at temperatures ranging from about 300°-350° F., and preferably the curing temperature is about 340° F.

DETAILED DESCRIPTION OF THE PREFERRED EMBODIMENT

In a preferred embodiment, the molded rubber products of this invention are prepared by mixing, calendering, and molding for a time of less than 5 minutes and preferably about 4 minutes. By virtue of this process, it is possible to rapidly and efficiently prepare rubber products which are admirably suited for use in the pharmaceutical industry.

A typical formulation useful for the present invention will include the halobutyl rubber, such as chlorobutyl or bromobutyl rubber. These products are commercially available from a variety of venders. Typically, the formulation will contain from about 50 to about 90% by weight of the bromobutyl rubber.

The formulation will also contain a quantity of zinc oxide. Typically, zinc oxide is provided in a powder form which has been dispersed in mineral oil. Typical amounts of zinc oxide will range from less than 0.5% to more than 2.0% by weight, based upon the weight of the entire formulation. Zinc oxide is a well-known curing agent for elastomeric formulations and particularly for various butyl rubber formulations. The third component of the formulation of this invention is a curing agent, m-phenylene bis-maleimide, hereinafter referred to as m-PBM. This curing agent, m-PBM, has been known as a co-agent for curing various systems which employ a peroxide cure. It is also known as a curing agent for a chlorosulfonated polyethylene manufactured by DuPont under the trade name HYPALON® synthetic rubber. DuPont manufactures m-PBM under the trade name HVA-2®. The amount of m-PBM necessary to prepare the compositions of this invention will range from less than about 0.5% by weight to up to 1.5% by weight, based upon the weight of the total formulation. In order to effect a rapid cure of the halobutyl rubbers of the present invention, it is not necessary to use the full theoretical amount of m-PBM to achieve maximum crosslinking. The present invention includes the step of molding the final product under temperature and pressure conditions which permit the surprisingly small amount of m-PBM to effect a satisfactory cure in surprisingly small amounts of time.

Of course, as in most formulations for molded rubber products, other ingredients are contained in the formulation. For example, a variety of fillers may be employed ranging from as little as zero to as much as 50% by weight of the total composition. Typical fillers include various clays, talcs and other conventionally employed fillers which serve to modify the overall characteristics of the product to suit the desired end use of the product. Also, carbon black and other color aids may be present in the amount ranging from as little as 0 to as much as 6% by weight. Other additives such as anti-sticking agents, anti-static agents and the like may be employed in the conventional manner.

A preferred formulation which is admirably suited to prepare the molded rubber products of the present invention is set forth below in Table I.

TABLE I

| Ingredient | Percent by weight based on total weight |
| --- | --- |
| Halobutyl rubber | 46.3–71.3 |
| Clay | 20.0–30.0 |
| Talc | 5.0–15.0 |
| Carbon black | 0.15–1.0 |
| Oil | 1.0–2.0 |
| Titanium dioxide | 0.5–2.5 |
| Stearic acid | 0.5–1.5 |
| Zinc oxide | 0.5–2.0 |
| m-PBM | 0.5–1.5 |

Shown below in Table II is a specific formulation which has been used to provide satisfactory molded rubber products for use in the pharmaceutical industry.

TABLE II

| Ingredient | Percent by weight based on total weight |
| --- | --- |
| Bromobutyl rubber | 60.1 |
| Clay | 22.8 |
| Talc | 11.4 |
| Carbon black | 0.2 |
| Mineral oil | 1.3 |
| Titanium dioxide | 1.8 |
| Stearic acid | 0.6 |
| Zinc oxide | 1.1 |
| m-PMB | 0.6 |

Typically, the conventional compression molding process for manufacturing molded rubber products may be employed using the above-identified ingredients. Specific conditions for one molding process of the compositions of this invention are set forth herein. The first step comprises mixing the ingredients set forth above. Typically, the halobutyl rubber and coloring agent are mixed for a period of time to complete breakdown of the rubber into processible particle size. While maintaining a temperature below that which causes premature initiation of the curing step, the other ingredients may be added singularly or in stages. It is preferred that the temperature be maintained below 200° F. The product is then transferred to a stock blender and the curing system of zinc oxide and m-PBM is added. After mixing, and while maintaining the temperature below 200° F., the mixture is then transferred to a calender so that a sheet may be prepared. Typically, the calender is maintained at a temperature of from less than 145° F. up to about 200° F., and preferably between 170° F. and 200° F. The sheet is then transferred to the molding step. Alternatively, the mixture can be premolded into pellets and used in that form rather than in sheet form as long as no coatings are used which might initiate vulcanization. Zinc stearate is sometime used in pellet processes.

During the molding step, the sheet prepared from the formulation as described above is placed in a mold and subjected to temperature and pressure for a period of time sufficient to effect a cure. Typically, formulations of the present invention may be cured in less than about 5 minutes and preferably from about 3–5 minutes. An optimum cure time is about 4 minutes. Pressures for the cure, particularly when injection molding is used to mold the rubber products, will be carried out at a pressure of from less than 500 psi to up to about 2000 psi. The temperature of the injection molding process should be from about 300 to about 375° F.

In order to demonstrate the efficacy of the present invention, a number of rubber stoppers were prepared on commercial molding equipment, using the formulation set forth in Table II above. Under cooling conditions, the bromobutyl rubber and carbon black were mixed for approximately 2 minutes after which the titanium dioxide, stearic acid and talc were added. Half of the mineral oil was also added and this mixture was mixed under cooling conditions for about 2 minutes. At the end of this time, the sides of the mixing unit were brushed to return unmixed components and the calcined clay and remainder of oil were added. This formulation was then mixed for an additional 2 minutes, as the additions were being made, followed by 1 minute of mixing after all the ingredients had been added. Temperature was maintained at about 200° F. The mixed product was then transferred to a stock blender and the zinc oxide and mPBM were added while mixing for 2 minutes. This mixture was then transferred to a calender where 8¾"×0.140" sheets were prepared on the calender. The temperature of the calender was approximately 170° F.

The calender sheets were then transferred to a compression molding cavity and formed into rubber stoppers at a pressure of about 760 psi and a temperature of about 340° F. The mold was maintained at these conditions for approximately 4 minutes, after which time, the finished products were removed. Other samples were made at pressures up to 2000 psi. The products were satisfactorily suitable for use as rubber stoppers in the pharmaceutical industry.

Presented below in Table III are the physical properties of products prepared as just described.

TABLE III

| Physical properties of cured mold rubber product | |
|---|---|
| Property | Data |
| Durometer | 50 |
| Tensile strength | 667 |
| Modulus | 378 |
| Elongation percent | 600 |
| Compression set | 25.4 |

A number of other samples were prepared in a similar manner. Specifically, both chlorobutyl rubber and bromobutyl rubber were effectively processed into molded rubber products suitable for use in the pharmaceutical industry. The amount of zinc oxide catalyst ranged from 0.5 to 2.0 percent by weight, based on the total weight of the formulation. Similarly, the amount of mPBM ranged from 0.5 percent to about 1.5 percent by weight. The molding conditions for each of the satisfactory samples ranged from as low as 700 psi to as high as 2000 psi and at temperatures ranging from as low as 325° F. to as much as 375° F. Most suitable products were prepared at approximately 340° F. The amount of time necessary to achieve a satisfactory cure ranged from as low as 3 minutes to as much as 5 minutes. A number of satisfactory samples were prepared in processes where the curing took place in approximately 4 minutes.

What is claimed is:

1. A method of producing a molded rubber product for use in the pharmaceutical industry, comprising the steps of:
   mixing a rubber formulation including a halogenated butyl rubber and a curing system of from 0.5 to 3.0 parts by weight of zinc oxide and from 0.5 to 3.0 parts by weight of m-phenylene bismaleimide, said parts being based upon 100 parts of halogenated butyl rubber;
   forming a premold from said mixture;
   molding said premold into a molded rubber product at a pressure of at least 1000 psi and at a temperature of up to 375° F. for up to 5 minutes; and
   removing said formed product.

2. The method of claim 1, wherein said mixture is maintained at less than 200° F.

3. The method of claim 1, wherein said premold is a sheet formed by feeding said mixture through a calender means.

4. The method of claim 3, wherein said sheet is formed in said calender at less than 200° F.

5. The method of claim 4, wherein said mixture is maintained at less than 200° F. and said sheet is formed in said calender at a temperature of at least 170° F. and less than 200° F.

6. The method of claim 1, wherein said halogenated butyl rubber is bromobutyl rubber.

7. The method of claim 1, wherein said molding is a compression molding step.

8. The method of claim 7, wherein said compression molding takes place at from 500 to 2000 psi for from 3 to 5 minutes at a temperature between 330° F. and 350° F.

9. A method of producing a molded rubber product for use in the pharmaceutical industry comprising the steps of:
   mixing a rubber formulation at less than about 200° F., said formulation including bromobutyl rubber and a curing system of from 0.5 to 3.0 parts by weight of zinc oxide and from 0.5 to 3.0 parts by weight of m-phenylene bis-maleimide, said parts being based upon 100 parts of halogenated butyl rubber;
   forming a sheet from said mixture by feeding said mixture through a calendar means at a temperature ranging from 145° F. to 200° F.;
   molding said calendar sheet into a molded rubber product by molding at a pressure of from 500 to 2000 psi at a temperature of from 330° F. to 350° F. for about 4 minutes; and
   removing said formed product.

10. The method of claim 9, wherein said molding step is a compression molding process.

11. A molded rubber product suitable for use in a pharmaceutical product, comprising a halogenated butyl rubber admixed with a curing system having from 0.5 to 3.0 parts by weight of zinc oxide and 0.5 to 3.0 parts by weight of m-phenylene bis-maleimide, said parts being based on 100 parts of halogenated butyl rubber, and said mixture having been formed into a premold and thereafter molded into a desired shape by molding at a pressure of at least 500 psi at a temperature of up to 375° F. for up to 5 minutes.

12. The product of claim 11, wherein said mixture is maintained at less than about 200° F.

13. The product of claim 11, wherein said premold is formed in a calendar process at less than about 200° F.

14. The product of claim 13, wherein said mixture is maintained at less than about 200° F. and said sheet is formed in said calender at a temperature of at least 145° F. and up to 200° F.

15. The product of claim 11, wherein said halogenated butyl rubber is bromobutyl rubber.

16. The product of claim 11, wherein said molding is a compression molding step.

17. The product of claim 16, wherein said compression molding takes place at from 500 to 2000 psi for from 3 to 5 minutes at a temperature between 330° F. and 350° F.

* * * * *